United States Patent [19]
Nilsson

[11] Patent Number: 5,315,736
[45] Date of Patent: May 31, 1994

[54] CONNECTION FOR AN ANCHOR LINE TO A TARPAULIN WHICH RUPTURES BEFORE THE TARPAULIN TEARS

[75] Inventor: Ivan Nilsson, Frälsevägen, Sweden

[73] Assignee: Plast Och Textil Ivan Nilsson, Furulund, Sweden

[21] Appl. No.: 6,257

[22] Filed: Jan. 19, 1993

[30] Foreign Application Priority Data

Jan. 20, 1992 [SE] Sweden ............... 9200143-7

[51] Int. Cl.$^5$ ............ F16G 11/00; E04H 15/00
[52] U.S. Cl. ................. 24/115 K; 24/18; 24/115 F; 135/119
[58] Field of Search ......... 24/115 K, 115 F, 18, 24/602, 455, 3 B; 135/119, 120; 52/3

[56] References Cited

U.S. PATENT DOCUMENTS

| | | | |
|---|---|---|---|
| 167,300 | 8/1875 | Burnham, Jr. .............. | 24/49 CC |
| 762,599 | 6/1904 | Priddat ...................... | 24/18 |
| 824,904 | 7/1906 | Cammett et al. ............ | 24/18 |
| 1,871,570 | 8/1932 | Weber ........................ | 52/3 |
| 3,059,657 | 10/1962 | Turner ....................... | 135/119 |
| 3,116,746 | 1/1964 | Bird .......................... | 135/119 |
| 3,162,920 | 12/1964 | Durham ..................... | 135/119 |
| 4,186,690 | 2/1980 | Seiler ........................ | 24/115 F |
| 4,370,783 | 2/1983 | Fretwell, Jr. ................ | 24/115 F |

FOREIGN PATENT DOCUMENTS 8413309 3/1984 Fed. Rep. of Germany.
9105622 8/1991 Fed. Rep. of Germany.

*Primary Examiner*—Victor N. Sakran
*Attorney, Agent, or Firm*—Ladas & Parry

[57] ABSTRACT

A device (2) in a tarpaulin (3) for connecting a line (10) with the tarpaulin. A sheet of foldable material is folded over and forms two opposing portions (5, 6) which are interconnected with one another along a fold edge (48) formed during the folding. Each one of the opposing portions is fixed to an edge portion (31) of the tarpaulin (3) sandwiched between them. The device includes part portions (7, 8) which are located outside the defining edge (32) of the edge portion (31). The part portions form therebetween at least two mutually located channels (49a, b) which are substantially parallel to the defining edge (32) and are separated by a recess (40) in the fold edge (48). In one embodiment a line (10) is passed into one of the channels in order to anchor the tarpaulin and in another embodiment the line engages an anchorage rod (11) inserted in the channels.

15 Claims, 7 Drawing Sheets

CONNECTION FOR AN ANCHOR LINE TO A TARPAULIN WHICH RUPTURES BEFORE THE TARPAULIN TEARS

TECHNICAL FIELD

The present invention relates to a device for attaching to a tarpaulin or the like a tackle, for example a line, a rope or the like.

BACKGROUND ART

In many contexts, there is a need to be able reliably to anchor, for example, a tarpaulin provided for protecting an object, disposed over a load platform, etc. As a rule, once the tarpaulin has been arranged such that the protection desired in the relevant case has been achieved, the tarpaulin is secured by being fixed in its edge areas to permanent objects, for example, by means of lines or ropes. The edge areas are provided with, for example, grommets in which the lines or ropes are secured. It is obvious that, when large forces are applied to the edge areas of the tarpaulin there is a risk that the material there will rupture.

If tears or ruptures occur in the edge areas of the tarpaulin, the tarpaulin will generally become unusable or its protective function will cease at least to some degree until such time as it has been repaired. It would, therefore, be of considerable advantage if the anchorages of the ropes could be disposed such that, when forces exceeding a predetermined magnitude are applied, the connection between the rope and the tarpaulin (the rope anchorage) breaks while the edge area of the tarpaulin remains intact.

It is also desirable to be able to dispose the tarpaulin so as to facilitate anchorage of the ropes in the tarpaulin. In addition, it is desirable to arrange the anchorage, such that, if rupture occurs in the rope anchorage, the time re-secure the line to the tarpaulin is reduced to a minimum.

OBJECTS OF THE INVENTION

The present invention has for its object to provide apparatus which satisfies the above objectives.

BRIEF DESCRIPTION OF THE ACCOMPANYING DRAWINGS

The present invention will now be described in greater detail hereinbelow, with particular reference to the accompanying drawings, in which.

DETAILED DESCRIPTION OF PREFERRED EMBODIMENTS

Figure 1:
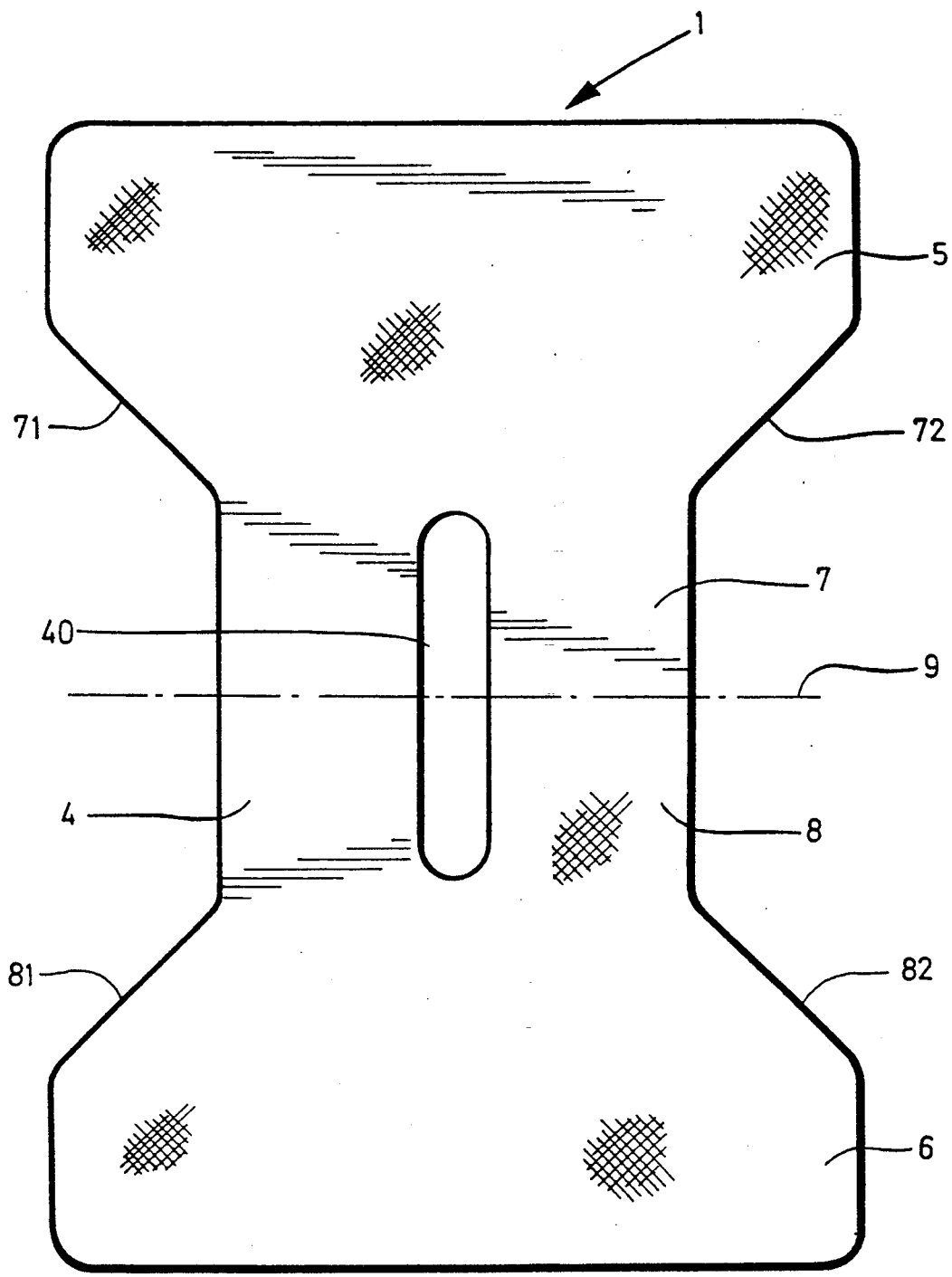
FIG. 1 is a view of a sheet of foldable material employed for forming the device.

FIG. 1 shows a blank in the form of a sheet 1 of a foldable material such as coated fabric, tarpaulin fabric or the like. The sheet is substantially symmetrical about a center line 9 and comprises portions 5 and 6, respectively, on either side of the center line for being folded towards one another about the center line for forming the device according to the invention. In the central region 4 of the blank, there is provided a slot or recess 40 which is also substantially symmetrical about the center line.

Figure 2:
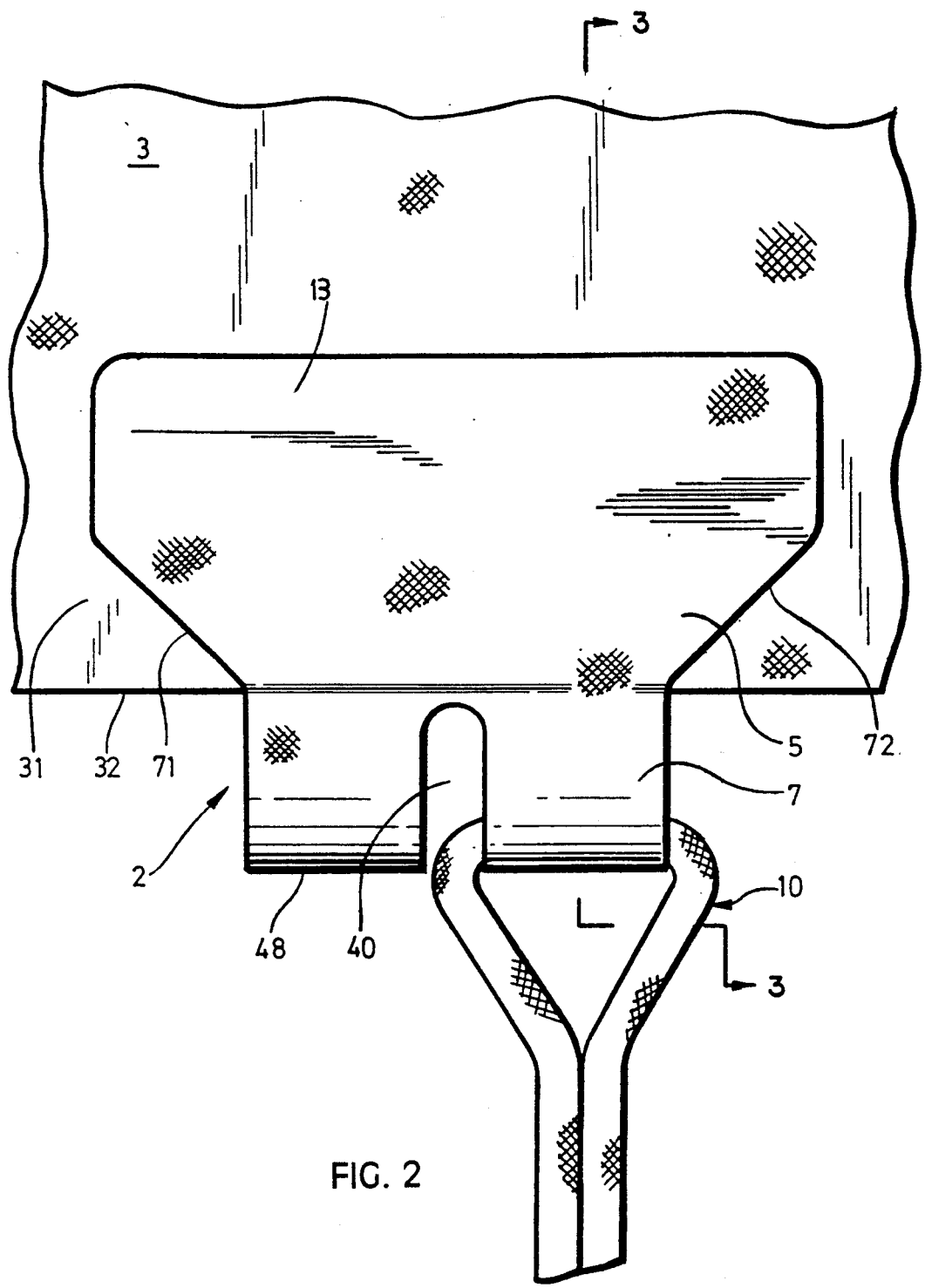
FIG. 2 shows the device formed after folding the sheet, secured to the edge area of a tarpaulin.
Figure 6:
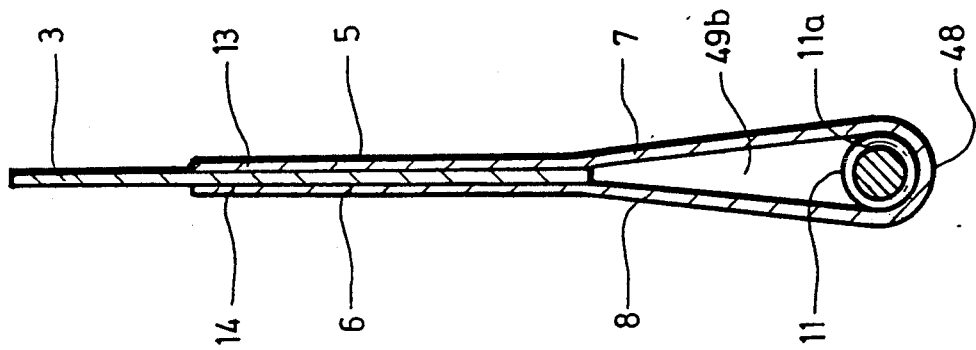
FIG. 6 is a section taken along the line 6—6 in FIG. 5.
Figure 3:
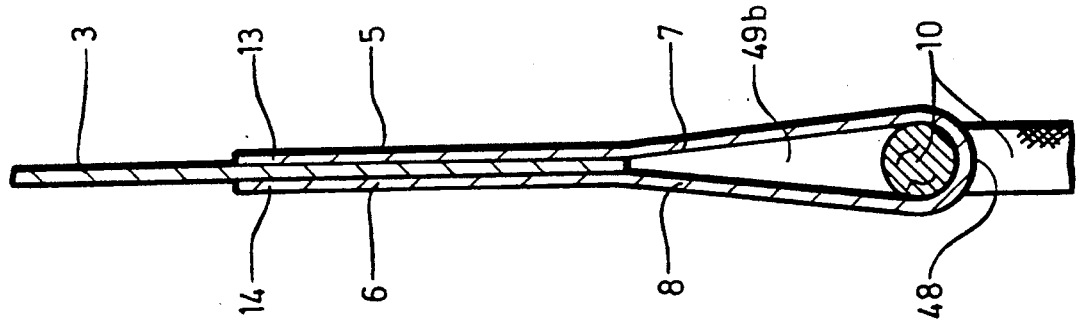
FIG. 3 is a section taken along the line 3—3 in FIG. 2.
Figure 4:
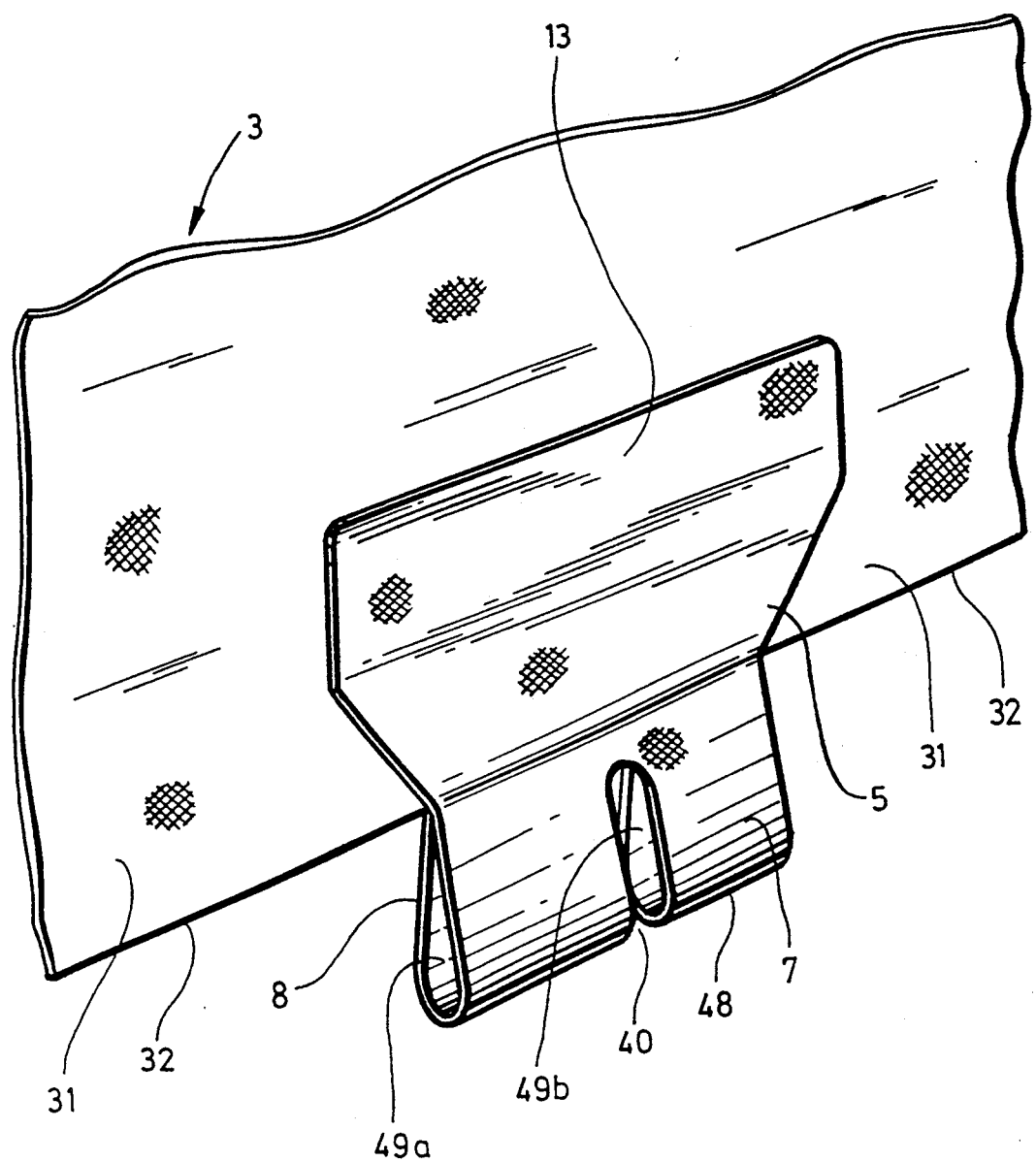
FIG. 4 is a perspective view of the device according to the present invention secured to the edge area of the tarpaulin.

FIGS. 2-4 show the sheet after folding for forming a device 2 in which the portions 5 and 6 are placed opposite one another and fixed against to an edge portion 31 of a tarpaulin 3 disposed between them. The connection between the opposing portions and the tarpaulin is formed by any optional suitable connecting means which connects the portions with the tarpaulin along substantially all of the surface or portion, respectively facing the tarpaulin. The connection consists, for instance, of a welded joint or glue-joint. The opposing portions 5, 6 include part portions 7, 8 which are located outside the bounding definition edge 32 of the edge portion 31 (cf. also FIG. 1) and merge into one another in a fold edge 48 which is formed when the portions 5 and 6 are folded towards one another. In the fold edge, there is disposed the recess 40 which, in each part portion 7, 8, continues in a direction towards the edge portion 31. The length of the recess in each respective part portion substantially corresponds and, at most, reaches up to the defining edge 32. As a rule, the recess is of a length which corresponds to at least a quarter and preferably at least a third of the distance from the fold edge 48 to the defining edge 32.

Adjacent the fold edge, the part portions 7, 8 form two loop portions with respective channels 49a, b which are separated by the recess 40 and which are substantially parallel with the defining edge 32 of the tarpaulin. In certain embodiments, the portions 5, 6 are provided with a plurality of recesses 40, whereby the part portions 7, 8 will include more than two mutually subsequently disposed channels.

Each respective portion 5, 6 is defined in those parts 13, 14 where they surround the tarpaulin 3 and most proximal the defining edge 32 by a defining edge 71, 72 and 81, 82, respectively, directed at an angle towards the edge 32 and the recess 40. In one preferred embodiment, the angle relative to the defining edge is of the order of magnitude of between 35° and 55°, preferably of the order of magnitude of between 40° and 50°.

FIGS. 2 and 3 also show a rope or a line 10 which is inserted in one of the two channels 49a, b, namely in the channel 49b.

FIGS. 5-8 show embodiments of the device in which a generally cylindrical anchorage rod 11 is inserted in two mutually adjacent channels 49a, b and includes a part 11a which is located in the region of the recess 40. The length of the anchorage rod corresponds substantially to the sum total of the length of two mutually subsequently disposed channels and the width of the recess 40 located between the channels. The line 10 is intended to be secured around that part of the rod which is disposed in the recess 40. However, in order to render the Drawing clearer, the line has not been shown in FIGS. 5-7.

Figure 5:
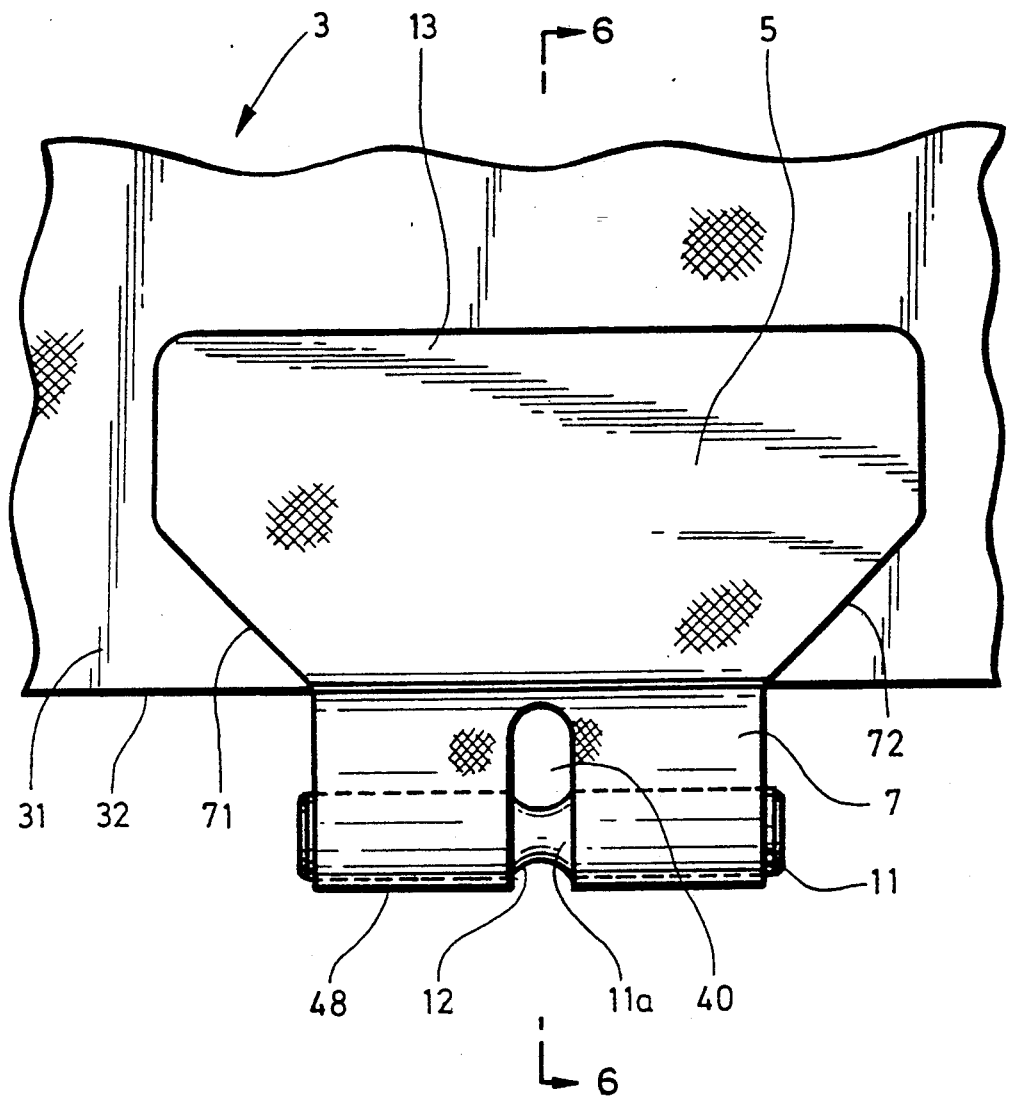
FIG. 5 shows one alternative embodiment of the device.

FIG. 5 shows one embodiment of the present invention in which the anchorage rod, in that part 11a which is intended to be disposed in the region of the recess 40, is provided with a weakened portion 12. This is shown as a circumferential groove 12 whose cross section is adapted to the dimensions of the line and forms a part of a curve, e.g. an elliptical or circular curve. It will be obvious to a person skilled in the art that the weakened portion 12 can have different cross section or can consist of a material portion which having less mechanical strength than the material of the rod which surrounds the weakened portion.

Figure 7:
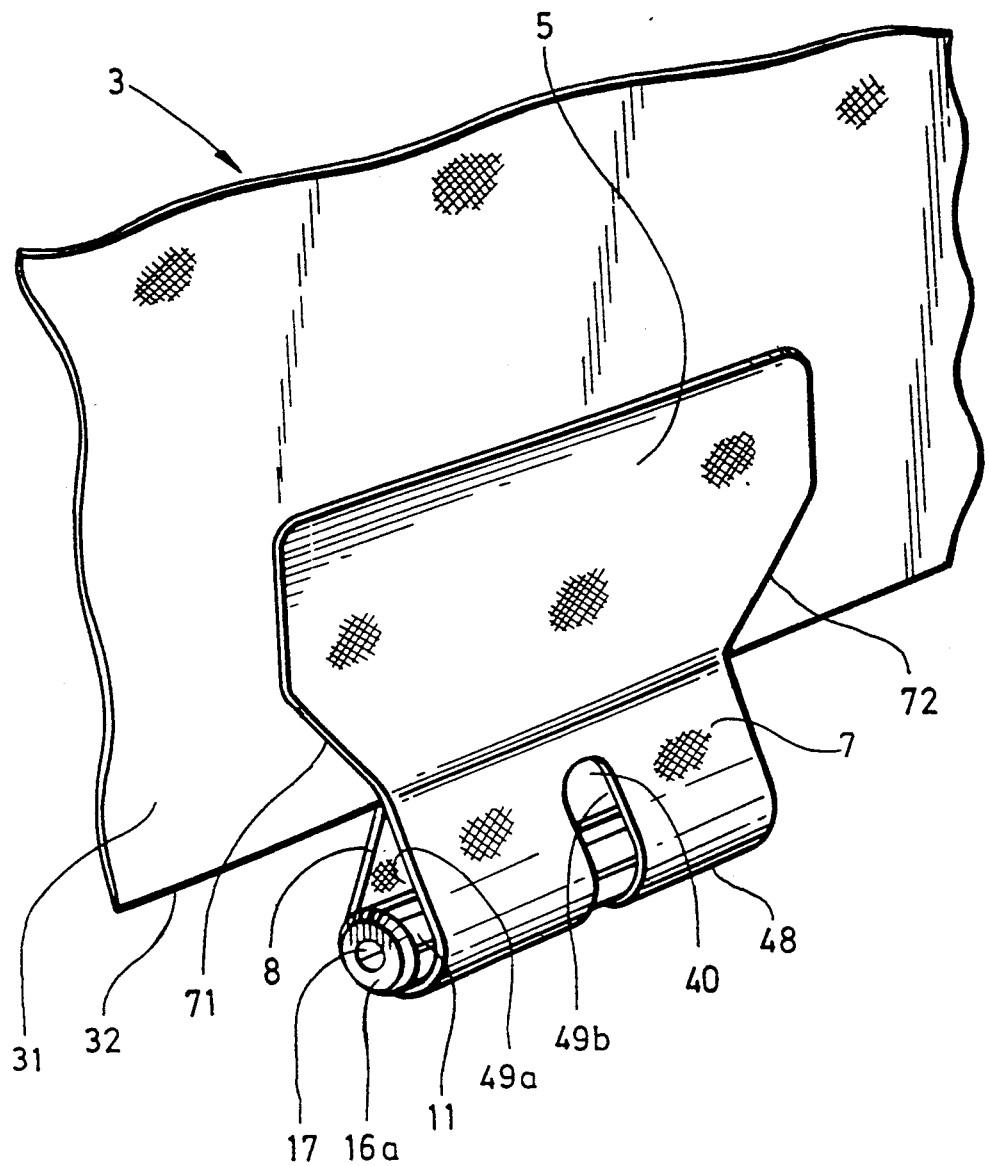
FIG. 7 is a perspective view of the embodiment according to FIG. 5.
Figure 8:
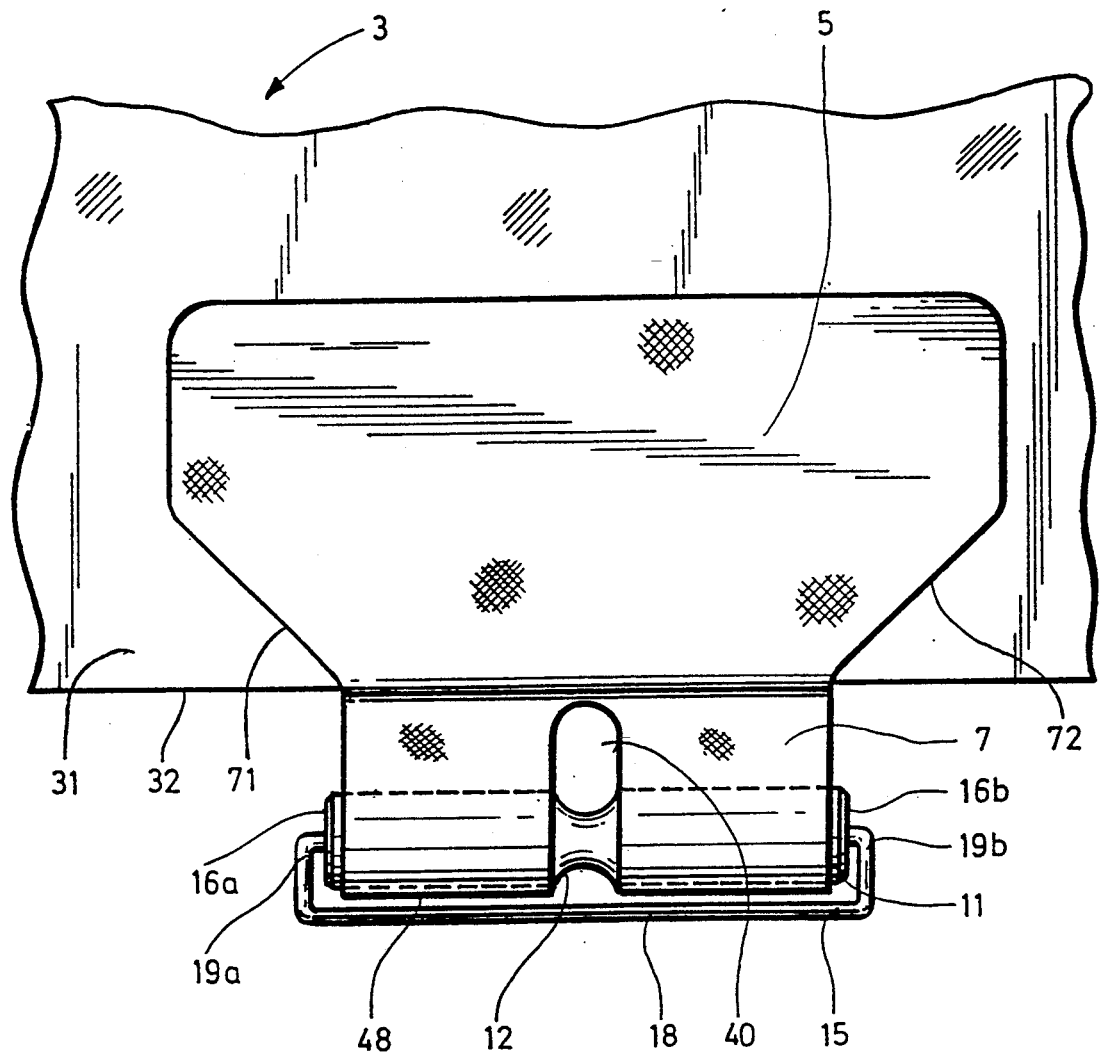
FIG. 8 shows the device according to FIGS. 5 or 7 provided with a safety device.

In one preferred embodiment, the anchorage rod 11 is provided with one or more safety devices 15 which prevent the anchorage rod from sliding out of the channels 49a, b. FIGS. 7 and 8 show one embodiment of the anchorage rod in which, for this purpose, it is provided with recesses 17 disposed in its opposite end surfaces 16a, b for cooperation with the safety device. In this instance, the device 15 is provided with means 19a,b which are inserted in each respective recess 17. FIG. 8 shows one embodiment of the safety device which comprises a resilient yoke 15a of, for example, steel wire whose end portions 19a,b are, as a result of the resilient return force of the yoke, inserted in each respective recess 17 of the opposing end surfaces 16a,b. Hereby, the material in the part portions 7,8 will be surrounded by the anchorage rod 11 in combination with the safety device 15. Only when the connection between the anchorage rod 11 and the safety device 15 has been broken will it be possible to remove the anchorage rod from the channels 49a,b. As a rule, the yoke 15a forms, between its end portions, a connecting portion 18 which is substantially parallel with the longitudinal axis of the anchorage rod.

When the embodiment illustrated in FIGS. 1-4 is put into use, the line 10 is passed into one of the channels 49a,b. Then tensile forces are applied in the line, these are transmitted to the material in the part portions 7,8 which define the employed channel. These forces are absorbed by the tarpaulin via the portions 13,14 of the opposing portions 5,6 secured to the tarpaulin. As a result of the above-indicated oblique disposition of the defining edges 71,72 and 81,82, respectively of the parts 13 and 14, there will be achieved an expedient distribution of the forces and thereby also a distributed strain in the connection between the material in the parts 13,14 and the material in the tarpaulin 3. If the forces involved were to become excessively great, the device according to the present invention is primarily dimensioned in order that the material in the part portions 7,8 will rupture. It will hereby be ensured that the tarpaulin can, without delay, once again be secured to the line in that this is passed in and anchored to the tarpaulin with the aid of the remaining whole channel.

When the embodiment according to FIGS. 5-8 is employed, a considerably increased strength will naturally be achieved in the device, since all material in both of the part portions 7,8 cooperates in order to absorb those forces which are transferred to the device via the line 10. In certain occasions of use, the strains will, however, be so great that the material in the part portions risks rupturing. There may also be a risk that the material in the tarpaulic 3 or the connection between the opposing portions 5,6 and the tarpaulin ruptures. In order to ensure that excessively great forces in the line do not result in the above-indicated consequences, the anchorage rod is, in certain practical applications, provided with the weakened portion 12. In such instance, the anchorage rod will be broken in the weakened portion 12 before the connection between the device and the tarpaulin ruptures or the material in the tarpaulin or the device fails.

It may generally be said that, when the device is exposed to extreme tensile forces, there is a risk that failure occurs in the material of the tarpaulin unless specific measures are adopted. For example, such failure occurs between the opposing portions 5,6 of the tarpaulin or outside the opposing portions, but as a rule in the immediate vicinity thereof. The term failure in the material of the tarpaulin also encompasses that event which occurs when an outer layer of plastic material slides in relation to a subjacent fabric carrier layer to which the layer of plastic material is secured. As has already been intimated above, failure also occurs in the connection between the opposing portions 5,6 and the tarpaulin.

As indicated above, the device is generally secured to the tarpaulin in that the material in the device is welded to the material in the tarpaulin. It is obvious to a person skilled in the art that the present invention encompasses alternative techniques for securing the device to the tarpaulin. The choice of material for the device proper is determined by the mechanical strength it is desired that the device possess. In one preferred embodiment, the dimensions and the material of the device are selected such that the tarpaulin is kept intact even when the tensile forces in those lines or ropes which have been connected to the device exceed predetermined values. In order to attain this effect, the part portions 7,8 of the opposing portions 5,6 are dimensioned so that, on overload, failure takes place in the part portions 7,8. Failures in the tarpaulin itself will be avoided in that the parts 13,14 of the opposing portions 5,6 secured to the tarpaulin are given sufficient size in order that the material in the tarpaulin will be capable of absorbing the forces distributed by the device according to the present invention without rupturing.

The above detailed description has referred to but a limited number of embodiments of the present invention, but it will readily be perceived by a person skilled in this art that the present invention encompasses a large number of embodiments without departing from the spirit and scope of the appended claims.

What is claimed is:

1. A device for attachment to a tarpaulin to transmit tensile force from a line to the tarpaulin, said device comprising a blank in the form of a sheet of foldable material which is folded on a fold line to form two opposed portions which sandwich and secure an edge portion of a tarpaulin therebetween in a position in which parts of said opposed portions at said fold line extend beyond said edge portion of the tarpaulin, said blank being relatively small compared to said tarpaulin in order to be applied to the edge of said tarpaulin in a selected, restricted region thereof, said sheet of foldable material being provided with a narrow slot therein extending across said fold line to divide said parts which extend beyond said edge portion of the tarpaulin into two sections of loop form having respective channels extending substantially parallel to an edge of said edge portion of the tarpaulin, said channels being separated by said slot and having a length in a direction parallel to the edge of the tarpaulin which is greater than the length of said slot as measured in said direction.

2. A device as claimed in claim 1, wherein said slot has a length in said sheet measured in the direction from said fold line towards said edge of the tarpaulin which is at least one-quarter of the distance between said fold line and said edge of the tarpaulin.

3. A device as claimed in claim 1, wherein said opposed portions of said sheet of material which secure the tarpaulin therebetween provide a connection with said tarpaulin of a strength exceeding a rupture strength of one of said sections of loop form whereby excessive force applied to said device at one of said sections will produce rupture of said one section before failure of the connection of the device to the tarpaulin and before rupture of the tarpaulin.

4. A device as claimed in claim 1, wherein said channels in said two sections are substantially aligned axially.

5. A device as claimed in claim 1, comprising an anchorage rod in said channels of said two sections.

6. A device as claimed in claim 5, wherein said anchorage rod has a length substantially corresponding to a sum total of the length of the channels in said two sections and the length of said slot between the channels.

7. A device as claimed in claim 6, wherein said anchorage rod includes a weakened region exposed at said slot such that application of force to said rod will produce rupture of said rod at said weakened region before rupture of the material of said sections of loop form or of the connection of said opposed portions to the tarpaulin.

8. A device as claimed in claim 7, wherein said weakened region of said rod comprises a circumferential groove provided in said rod.

9. A device as claimed in claim 5, comprising means for retaining said anchorage rod in said channels.

10. A device as claimed in claim 9, wherein said means for retaining said anchorage rod in said channels comprises a safety device including a resilient wire having ends engaged with ends of said anchorage rod and a connecting portion between said ends of said wire.

11. A device as claimed in claim 10, wherein said connecting portion extends parallel to said anchorage rod.

12. A device as claimed in claim 1, wherein said opposed portions of said material which sandwich and secure the edge portion of the tarpaulin therebetween increase in width from said two sections which extend beyond the edge of the tarpaulin, said opposed portion increasing in width in a direction away from said two sections to provide increasing area of contact with said tarpaulin.

13. A device as claimed in claim 12, wherein said narrow slot extends substantially perpendicularly to said fold line and has a length measured in the direction perpendicular to said fold line which is substantially greater than the length of the slot measured parallel to said fold line.

14. A device as claimed in claim 1, wherein said blank includes a central rectangular portion containing said slot, and tapered portions at opposite ends of said rectangular portion which widen outwardly in a direction away from said fold line.

15. A device as claimed in claim 14, wherein said blank further includes further rectangular portions extending outwardly from said tapered portions.

* * * * *